June 1, 1954
H. H. GORRIE
2,679,828
CONTROL SYSTEM
Filed Nov. 12, 1949
3 Sheets-Sheet 1
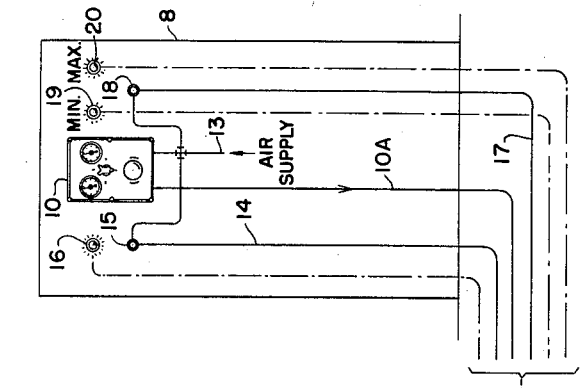
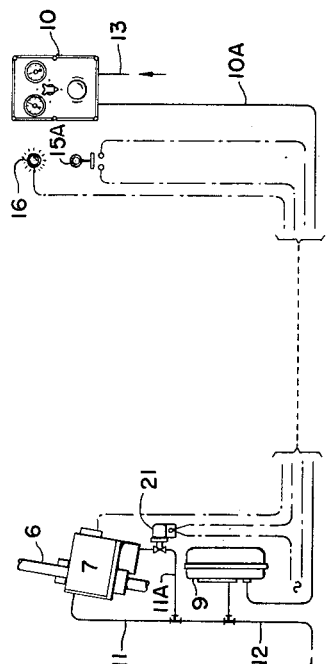
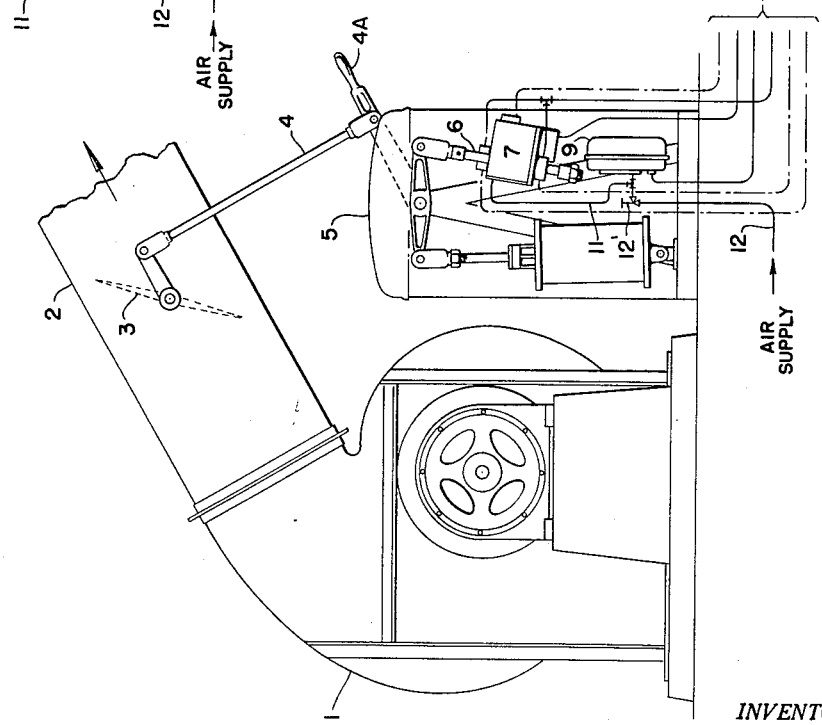
INVENTOR.
HARVARD H. GORRIE
BY
Raymond D. Junkins
ATTORNEY

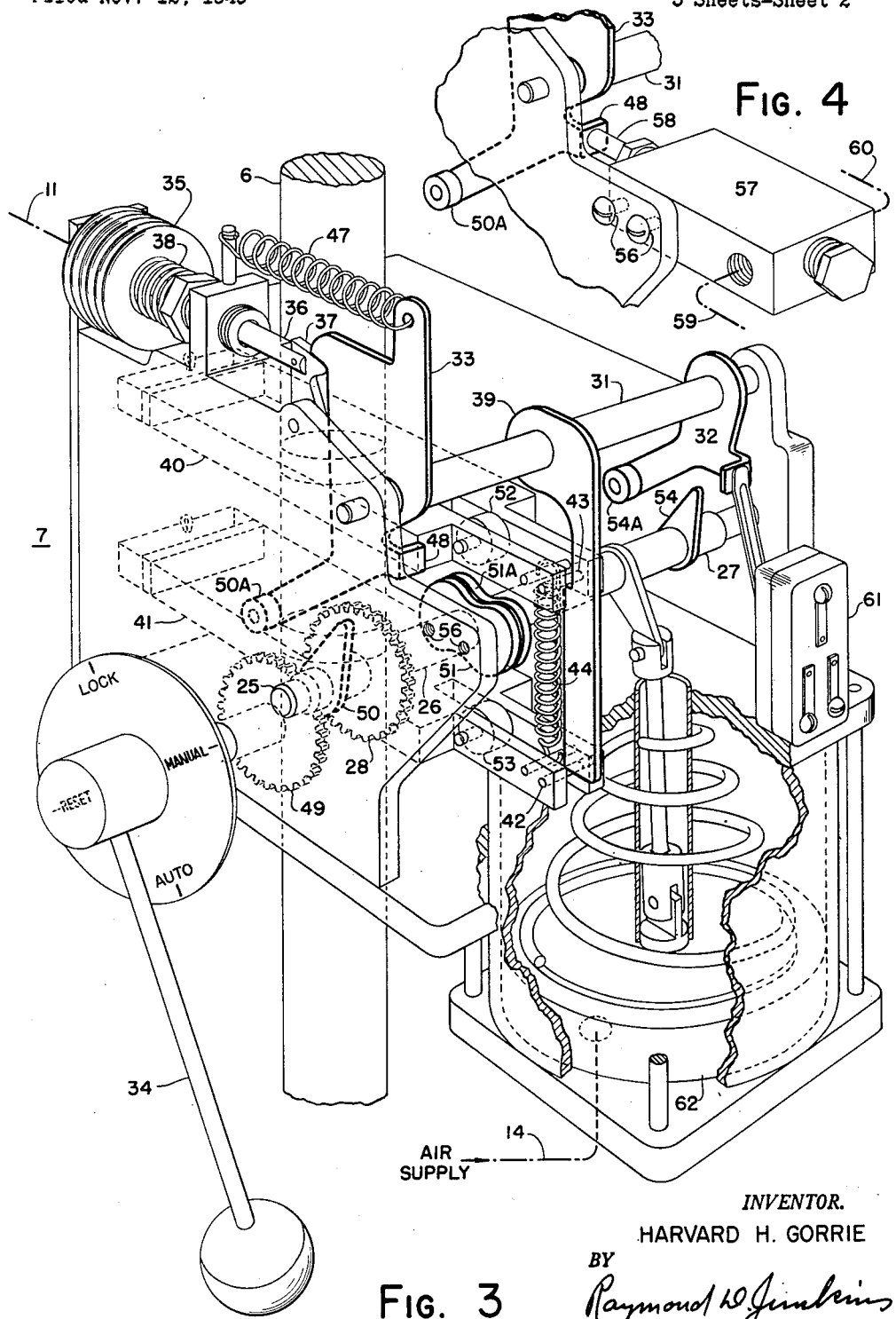

June 1, 1954  H. H. GORRIE  2,679,828
CONTROL SYSTEM

Filed Nov. 12, 1949  3 Sheets-Sheet 3

*INVENTOR.*
HARVARD H. GORRIE
BY
*Raymond W. Junkins*
ATTORNEY

Patented June 1, 1954

2,679,828

UNITED STATES PATENT OFFICE 2,679,828

CONTROL SYSTEM

Harvard H. Gorrie, Cleveland Heights, Ohio, assignor to Bailey Meter Company, a corporation of Delaware Application November 12, 1949, Serial No. 126,863

4 Claims. (Cl. 121—40)

My invention relates, generally, to locking mechanisms, and, more specifically, to automatic mechanisms which arrest members of uniformly transverse dimensions adapted to move longitudinally in performance of desired functions.

It is generally desirable to apply a locking couple to a shaft, rod or similar member because the same means of locking can be used to function at any point along the length of the member. My invention, therefore, provides a locking couple of constant strength which is automatically applied to the controlled member for maintaining said member at the position it finds itself at the appearance of a predetermined condition. The invention also provides a means of unlocking the couple manually, and if the predetermined condition has been eliminated, the locking couple will automatically be held in abeyance.

My invention has wide application in all condition systems whose units, partially or wholly, have a common motive power whose failure desirably causes the mechanism's control to be immobilized so that the process or condition affected will not be seriously impaired by erratic application of agents. Wherever a shaft of a mechanism or system is longitudinally activated automatically, my invention is adjustable thereto for staying its movement upon failure of the automatic system by which it is normally activated.

Aside from desired immobilization at any point, many control shafts are also in need of certain positive limitations in their direction of travel, subject to manually selective release for continuance to a final extreme position. My invention provides means of positively arresting the shaft at predetermined distance short of its extreme travel in each direction, subject to manual release for continuance to the extreme position of travel. It is of course desirable that visual indication of all the functions heretofore described be provided and my invention provides signals in the interest of safety and convenience.

Once the longitudinal movement of a shaft is arrested, the original control force upon the shaft exerts a continuing strain upon the locking mechanism which my invention seeks to nullify.

In the interest of clarity, and in the light of the foregoing, an object of my invention is seen as the arrestment of mechanisms in their mechanical movement upon the appearance of a predetermined condition.

Another object is to provide for the remote release and resetting of the locked mechanism.

Another object of my invention is to give visual indication of the arrestment.

A further object of my invention is seen in the elimination of the control force upon the arrested mechanism.

Still another object of my invention is to provide for positive limitation in each direction of mechanism travel with the provision for manual removal of the limiting mechanism and visual indication of said function.

In the drawings:

Fig. 1 is a diagrammatic illustration of one application of my complete invention.

Fig. 2 is a modification of Fig. 1.

Fig. 3 is a perspective view, partly in section, illustrating the cooperation of the majority of elements of the invention.

Fig. 4 shows a portion of the mechanism of Fig. 1.

Figure 5:
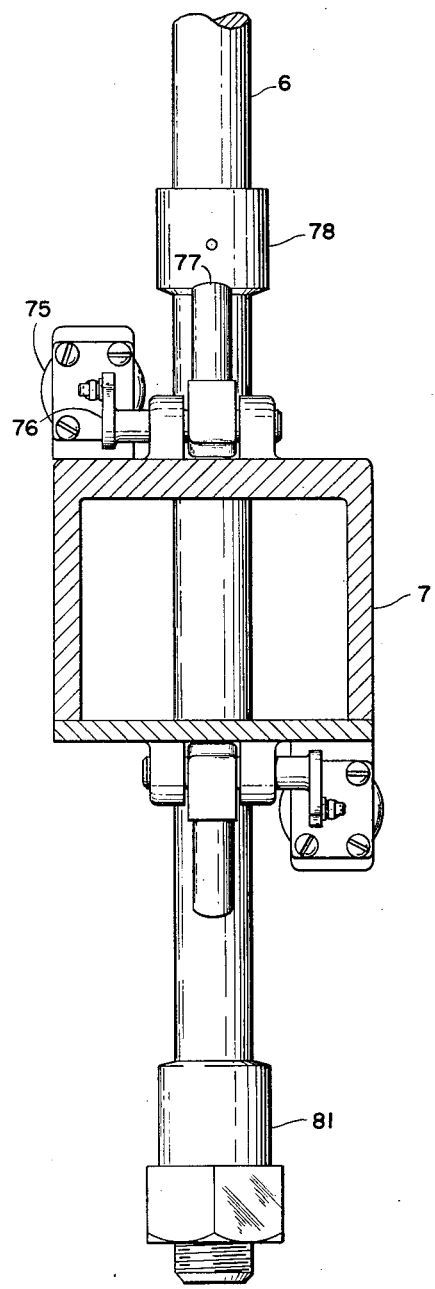
Figs. 5 and 6 illustrate maximum and minimum stop arrangements.

Referring now to Fig. 1, it may be seen that to illustrate an application of my invention a fan 1 is used, having its output through conduit 2 controlled by the positioning of a damper 3. Damper 3 is connected by an arrangement of linkage, illustrated here as a simple control rod 4, to a control drive 5. Disregarding as immaterial to the present invention the details of how the drive 5 functions in response to control forces and correspondingly varies the position of damper 3, we need merely note that the mechanism of the drive has a brake rod or shaft member 6 which moves longitudinally in response to control drive movements and extends through, and is under the control of a principal portion of my invention, shown quite diagrammatically at 7.

I show at 8 a remote station for control of the drive 5 through its positioner mechanism 9 and the device 7. Station 8 may take the form of a panel board on which is mounted a pneumatic selector valve 10 connected in the line between the source of control signals and the controlled drives to provide a means for interrupting the control signals and operating the drive remotely manually. The operation of the selector valve 10 is of no present consequence other than to note that it is suppled for manual operation from the air supply source common with drive positioner 9 and the other units, not shown, of the air operated type used in the control system. It is the failure of this common air supply that my invention senses in order to thereupon immobilize drive 5 and prevent any possibility of the damper 3 drifting wide open or tight closed. In order to sense the failure, air conduit 11 connects the device 7 to the common air supply line 12 which also supplies the positioner 9. The relation of conduit 11 to device 7 will be hereinafter described in detail, and it is necessary at present to simply understand that upon air failure the device 7 arrests movement of brake shaft 6. Preferably the supply pipe 11 and positioner 9 are jointly controlled by a valve 12' mounted on the positioner to the end that when the positioner 9 is purposely immobilized by closing valve 12' the air supply 11 is caused to fail, resulting in an automatic locking of the shaft 6.

In Fig. 3 is shown, in perspective and partial sectioning, the cooperating elements housed within the box 7 of Fig. 1 through which the brake shaft 6 reciprocates. For purposes of clarity an equalizing valve 57 of device 7 has been shown separately in Fig. 4.

Locking of the shaft 6 (and thereby of the damper drive system) is accomplished by a pair of brake plates 40, 41 loosely hinged in spaced relation to the housing 7. Each of the brake plates has a hole of slightly greater diameter than shaft 6 which passes therethrough. The free ends of plates 40, 41 are urged toward each other by a tension spring 44. When the plates are held in parallelism, against the action of spring 44, the shaft 6 may move freely through the aligned holes in the plates, but when the spring 44 is not restrained it urges the free ends of plates 40, 41 toward each other and the plates exert a clamping action upon shaft 6 restraining it from movement.

Fig. 3 shows the mechanism in normal automatic operating position with the operating lever 34 at "Auto" and with full air supply pressure available to the assembly at pipes 12 and 11. Pneumatic control signals reach the positioner 9 by way of pipe 10A from selector valve 10 and the positioner 9 produces a positioning of damper 3 in accordance with the dictates of such signals.

Although spring 44 is urging the free ends of plates 40, 41 toward each other, the plates are held in non-clamping spaced relation by a tripping lever 39 having a depending portion spacing the pins 42, 43 which are carried by plates 41, 40 respectively. The tripping lever 39 is carried by a shaft 31 arranged to be angularly moved in clockwise direction to place the depending portion of lever 39 between pins 42, 43 and in counter-clockwise direction to release the spacing of pins 42, 43.

In the operating position shown, the bellows 35 is expanded by the air supply pressure in pipe 11, against the compression of a spring 38, forcing a drive rod 36 to full extension and causing a trigger lever 37 to be engaged with a brake set lever 33 which is carried by shaft 31. The lever 33 (and shaft 31) are urged to ccw. rotation by a spring 47 but such rotation is prevented by the trigger 37.

It will be understood that the positioner 9 is a controlling relay device for the power cylinder, receiving signals through pipe 10A, and controlling the passage of air from supply pipe 12 to the power cylinder for positioning the damper 3. A principal object of my invention is to lock the power cylinder, rod 4 and damper 3 against movement in case of failure of air supply pressure in pipe 12. I accomplish this action by allowing the plates 40, 41 to clamp the shaft 6 responsive to such air supply failure.

Immediately upon loss of air supply pressure in pipe 12 (and in pipe 11) the bellows 35 contracts, pulling trigger 37 out of latching engagement with brake set lever 33. Spring 47 rotates lever 33 and shaft 31 ccw. thus removing the spacing portion of tripping lever 39 from between pins 42, 43, causing spring 44 to urge the free ends of plates 40, 41 together to clamp the shaft 6 and lock it against movement.

It will be seen that lever 33 carries a lug 48 which, upon release of trigger 37, moves to engage the operating plunger 58 (Fig. 4) of an equalizing valve 57 to open communication between pipes 59 and 60 which connect to opposite ends of the power cylinder. Thus, at the same time that shaft 6 is locked against movement, the pressures on opposite sides of the power piston are equalized.

The tripping lever shaft 31 also carries a remote release lever 32 arranged upon ccw. rotation to engage the movable element of an electrical switch 61 closing circuits to light the signal light 16 on panel 8.

Thus, when air supply pressure fails in pipe 12, the shaft 6 is immobilized, pressure is equalized across the power piston and the signal light 16 is lighted as a warning.

The arrangement of my invention is such that a resumption of supply air pressure in pipe 12 does not of itself restore the power drive to positioning of damper 3 until the brake has been released either locally or remotely under the control of an operator. This precludes the possibility of an accident or damage which might otherwise result. Resetting may be accomplished in each of two ways.

Local manual

I may move hand lever 34 to "Reset" position rotating gear 49 cw. and gear 28 ccw. Gear 28 drives a tubular shaft 26, sleeved on a shaft 25, thereby angularly positioning a manual reset cam 50 as well as a manual brake cam 51. Cam 51 engages rollers 52 and 53 to space the brake plates 40, 41 thus unlocking shaft 6. Cam 50 engages roller 50A moving levers 33, 39, 32 and shaft 31 cw. The spacing portion of tripping lever 39 enters between pins 42, 43; lug 48 moves away from rod 58 closing communication between pipes 59 and 60; lever 32 deenergizes switch 61 and causes light 16 to go out; and (if supply air pressure is again available in pipes 12 and 11) bellows 35 and rod 36 cause trigger 37 to enter below the projection of lever 33 and latch the system. If supply pressure is not yet available the bellows 35 is not expanded and trigger 37 remains retracted.

So long as hand lever 34 remains at "Reset" these elements retain their positions. If air supply pressure is available in 12 and signal is available in 10A, the system will function to automatically position damper 3 but the automatic locking will not function upon a subsequent air supply failure. The hand lever 34 is returned to "Auto" position and the system is reset for automatic operation and for automatic clamping of the brake upon subsequent air supply pressure failure.

If air supply pressure is not yet restored the damper will not be positioned even if signal is available in pipe 10A.

It will be seen that after air failure, the power drive may not be automatically operated from a signal in 10A until the brake has been reset. The resetting may be "local manual" as just described, or may be "remote reset."

Remote reset

Following an air failure and locking of shaft 6 (with lever 34 in "Auto" position) the brake may be reset remotely from panel 8 by the pneumatic pushbutton 15.

The signal light 16 is lit indicating that shaft 31 is in its ccw. extreme of travel, the switch 61 closed, equalizing valve 57 open, the spacing portion of 39 retracted from pins 42, 43, and the plates 40, 41 locking the shaft 6. The operator at panel 8 has reason to believe that air supply pressure is again available at 12, 11 and pushes button 15 thus opening connection between 13 and 14 making air supply pressure of 13 (if any) available to act upon a reset piston 62. If no air pressure is available in 13 nothing happens.

If air pressure is available in 13 (and then in 14) it acts through piston 62 to angularly move remote reset shaft 27 in a ccw. direction causing remote reset cam 54 to engage roller 54A and angularly move shaft 31, levers 33, 39, 32 and remote brake cam 51A cw. This results (as before) in deenergizing switch 61 (causing light 16 to go out), forcing plates 40, 41 apart and inserting the spacer of lever 39 between pins 42, 43, and placing 33 in such position as to be latched open by trigger 37 if the bellows 35 is expanded by air supply pressure in 12 and 11.

When the operator removes his finger from pushbutton 15 thus closing communication between 13 and 14; if air supply pressure is available at 12, then the trigger 37 latches the mechanism in reset position and the system may operate automatically. The signal light 16 stays out as an indication to the operator that the system is latched in reset position and that the brake is released from shaft 6.

If air pressure is not available in pipe 12 when the operator removes his finger from depressing pushbutton 15, then the signal light 16 relights showing that the trigger 37 was not advanced to latching position by the bellows 35. The shaft 6 is relocked by decay of air pressure in 14 below piston 62 allowing the latter to retract to its original position as shown in Fig. 3. A leak-off is provided below piston 62 to allow the piston to retract.

*Manual position*

As seen in Fig. 3 the handle 34 may be turned to a "manual" position which is the only position of handle 34 whereupon an operator may utilize the hand lever 4A to manually move the damper 3. If the supply valve 12' of positioner 9 is closed (or the air supply at 12 has failed) so that bellows 35 has contracted, and with lever 34 in "manual" position, the gear 49 turns the manual cam 51 to a position spreading the brake plates 40, 41 apart to free the brake shaft 6. Cam 50 does not need to contact roller 50A because the retraction of bellows 35 and trigger 37 has allowed spring 47 to move lug 48 to such position as to open the equalizing valve 57 thus equalizing pressure across the power piston. Switch 61 remains closed to light lamp 16 indicating that the mechanism is not in condition for automatic operation.

With pressure equalized across the power piston and with shaft 6 unlocked, then lever 4A may be manually moved to position the damper 3. Such movement of lever 4A will of course move the power piston in its cylinder and will move the shaft 6 longitudinally through the parallel brake plates 40, 41.

A fourth position indicates "Lock" is available for the lever 34 wherein the manual brake cam 51 is in a similar position to that shown in Fig. 3, the brake plates 40, 41 clamp the rod 6, the trigger 37 is disengaged from the brake set lever 33; the brake set lever 33 and remote reset levers hold the by-pass valve 57 open and the remote contact 61 closed.

It will be seen that a particularly advantageous feature of my invention is the provision of a remote release of the locking means and resetting of same to make it immediately available upon a subsequent air supply failure. Visual indication of the condition of the locking means is available either locally or remotely as described.

In Fig. 2 I show a modification of the arrangement just described wherein the remote reset operation is performed electrically through the agency of an electric pushbutton station 15A and a solenoid actuated valve 21, the latter located in a branch pipe 11A supplying the piston 62. The particular advantage of this embodiment is to take care of a condition wherein the air supply at pipe 12 may fail without failure of the air supply pressure at pipe 13. Under such condition the operator at panel 8 would be aware of availability of air supply pressure in 13 and would think that the same pressure were available in pipe 12.

In Fig. 2 the air supply for the resetting piston 62 is taken from conduit 11 as near the point at which it enters the positioner 9 as is feasible in order that no reset action can be made to take place until air supply is available to positioner 9. A solenoid switch 21 is placed in the air line 11A going to reset piston 62 with the necessary electric conductors connected to switch 15A. When the operator depresses switch 15A completing circuit to solenoid valve 21, it opens the pipe 11A to communication with the resetting piston 62 but nothing happens and the light 16 remains lit if air supply pressure is not yet available in pipes 12, 11 and 11A. If air supply pressure is available in pipe 12 then the resetting action is as previously described through the agency of piston 62.

My invention additionally provides a max. and min. travel limiting for the shaft 6 and thereby for the power piston and damper operating rod 4. It is usual in combustion control systems to use only a controllable portion of the 90° full angular travel of damper 3 when automatically controlling. This may be for example some 75° of angular motion depending upon the characteristic curve of damper motion against gas flow through the duct 2. Such 75° (for example) motion may be normally used for full control range of the system but at certain times it may be desirable to position the damper beyond the max. or min. point of the 75° travel. For example, at times of repair or cleaning of apparatus it may be desirable to tightly close the damper 3 or at other times to open it to its widest position. The arrangement of Figs. 5 and 6 show the provisions I have made for max. and min. travel limits of the shaft 6 (and consequently of the damper 3) and provisions for remotely releasing these limits so that full damper travel may be accomplished when desired.

Figure 6:
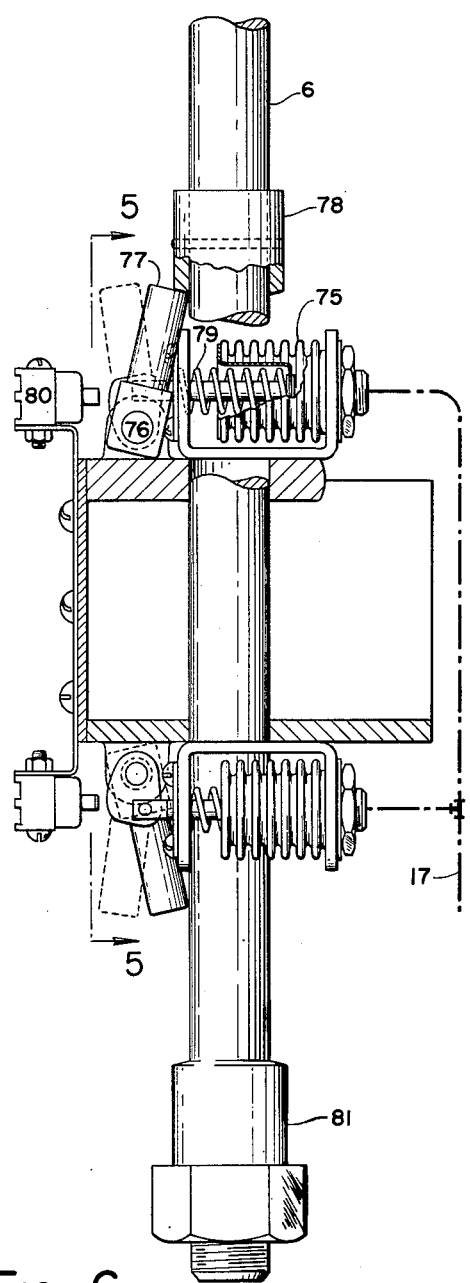

Referring now specifically to Figs. 5 and 6, it will be observed that the max. and min. travel limit stops may be effective upon the shaft 6 either with or without the air failure brake mechanism 7 although these two figures show the stop mechanism assembled with the device 7.

Sleeves 78 and 81 are supported on shaft 6 and are of an individual length to determine the max. and min. limits of travel of power piston short of full possible movement of the damper 3. The sleeves 78, 81 are usually determined as to length, and cut, on the job after the necessary adjustment of the system has indicated what portion or all of damper travel is most advantageously to be utilized. Inasmuch as the max. and min. stop and release mechanisms are similar, only one need be described in detail.

The arrangement of Figs. 5 and 6 is shown in normal operating condition wherein a spring 79 acts upon a retracted or collapsed bellows 75 to move the stop member 77 to a position riding the shaft 6 so that as the shaft 6 (on the drawing) moves downward the stop 77 will engage the stop sleeve 78 when predetermined max. travel is reached.

If, after initial installation, it is desired to change the stop position, i. e. the point where travel is stopped in either direction, it is comparatively easy to remove the member 77 and cut it off or replace it with a longer one. This saves having to dismantle and remove the upper sleeve 78.

The bellows 75 are connected to a pipe 17 leading to a pneumatic pushbutton 18 on the panel 8. If the operator desires to remotely remove the effect of the travel limits 78, 81 he depresses the button 18 allowing air supply pressures from pipe 13 to be transmitted through pipe 17 and become effective within bellows 75, expanding the same against the action of spring 79, rotating the shaft 76 and moving the stop pin 77 out of the way. Thereafter the shaft 6 may move its stop member 78, or 81 past the end of stop pin 77 to full mechanical travel of all of parts. As the shaft 76 is rotated in one direction or the other either by the bellows 75 or the spring 79, a cam thereon acts on the electric switch 80 to either energize or denergize the signal lights 19, 20 on panel 8 to show, as desired, that the travel limit stops have been effectively removed from availability. Furthermore, that the lights 19, 20 may be arranged to light when the stop limits are in effect or to be lighted when they are taken out of effective position. It is sufficient that I have provided a means for remotely removing the effect of max. and/or min. travel limits for the rod 6 and for visually indicating the availability of such limits of travel.

It will be appreciated that the various cooperating devices described above are preferably located about the separate shaft 6 rather than the main power piston shaft so that they may be adjusted or worked upon without removing the main piston and parts 4A, 4 and 3 from previous interrelation by dismantling. Inasmuch as the power unit is reversible in operational hook-up the stops 78, 81 may function as max. or min. stops as desired.

While I have illustrated and described certain preferred embodiments of my invention, it will be understood that these are by way of illustration only and are not to be considered as limiting.

What I claim as new, and desire to secure by Letters Patent of the United States, is:

1. A locking mechanism preventing longitudinal movement of a fluid pressure actuated power shaft including, two locking plates each pivoted from one of their ends under spring influence and accommodating the shaft through holes aligned when the plates are parallel, a plate member urged in one direction of rotation about a supporting shaft by a spring, a pivoted cam member rigidly attached to the plate member and interposed between the locking plates to maintain them in alignment, and fluid responsive means holding the plate member from rotation about its supporting shaft by the fluid pressure actuating the power shaft.

2. In a locking mechanism preventing longitudinal movement a fluid pressure actuated power shaft, two locking plates each pivoted from one of their ends under spring influence and accommodating the shaft through holes aligned when the plates are parallel, a pivoted cam member interposed between the locking plates for maintaining their alignment, a plate member rigidly attached to the cam member and urged in one direction of rotation about a supporting shaft by a spring, a rod holding the plate member against rotation by the spring, and an expansible member continuously responsive to the fluid pressure actuating the rod.

3. The combination of claim 2 wherein a means for manually restoring the unlocked position to the locking mechanism includes, a manually rotatable shaft bearing cams which spread the locking plates into alignment and rotate the plate member into locking cooperation with the rod and the interposed cam member into position between the locking plates.

4. The combination of claim 2 wherein a means for remotely manually restoring the unlocked position to the locking mechanism includes, a second fluid pressure actuated power means for unlocking the power shaft and latching it in unlocked condition, fluid pressure supply means, and a manually actuatable means for making said fluid pressure supply available to said second power means.

References Cited in the file of this patent

UNITED STATES PATENTS

| Number | Name | Date |
|---|---|---|
| 567,193 | Nash | Sept. 8, 1896 |
| 645,213 | Prindle | Mar. 13, 1900 |
| 722,894 | Potter | Mar. 17, 1903 |
| 782,412 | Neudorff | Feb. 14, 1905 |
| 991,241 | Rae | May 2, 1911 |
| 1,303,979 | Snyder et al. | May 20, 1919 |
| 1,618,773 | Meyers | Feb. 22, 1927 |
| 1,962,677 | Dickey | June 12, 1934 |
| 2,148,499 | Pilblad | Feb. 28, 1939 |
| 2,339,469 | Emanuel | Jan. 18, 1944 |
| 2,387,126 | Dillon | Oct. 16, 1945 |